United States Patent
Hilpert et al.

(10) Patent No.: US 10,605,692 B2
(45) Date of Patent: *Mar. 31, 2020

(54) AUTOMATED BOP CONTROL AND TEST SYSTEM

(71) Applicant: Engip, LLC, Houston, TX (US)

(72) Inventors: Clifford Lee Hilpert, Conroe, TX (US); Jeffrey Hilpert, Conroe, TX (US)

(73) Assignee: Engip LLC, Conroe, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,232

(22) Filed: Sep. 20, 2018

(65) Prior Publication Data

US 2019/0025152 A1 Jan. 24, 2019

Related U.S. Application Data

(63) Continuation of application No. 15/086,419, filed on Mar. 31, 2016, now Pat. No. 10,107,712.

(60) Provisional application No. 62/143,995, filed on Apr. 7, 2015.

(51) Int. Cl.
*E21B 33/06* (2006.01)
*E21B 44/00* (2006.01)
*G01M 3/28* (2006.01)

(52) U.S. Cl.
CPC ........... *G01M 3/2876* (2013.01); *E21B 33/06* (2013.01); *E21B 33/061* (2013.01); *E21B 44/00* (2013.01); *G01M 3/2815* (2013.01)

(58) Field of Classification Search
CPC .... G01M 3/28; G01M 3/2815; G01M 3/2876; E21B 33/06; E21B 33/061; E21B 34/02; E21B 34/04; E21B 44/00; E21B 47/00
See application file for complete search history.

(56) References Cited

U.S. PATENT DOCUMENTS

| | | | | |
|---|---|---|---|---|
| 4,461,354 A | * | 7/1984 | Buras | E21B 19/16 166/343 |
| 10,107,712 B2 | * | 10/2018 | Hilpert | E21B 33/061 |
| 2012/0152555 A1 | | 6/2012 | Judge | |

(Continued)

FOREIGN PATENT DOCUMENTS

| EP | 1270870 | 1/2003 |
|---|---|---|
| WO | 2014/074973 | 5/2014 |

OTHER PUBLICATIONS

Extended European Search Report for Application No. 16777213.6 dated Oct. 1, 2018.

(Continued)

*Primary Examiner* — Nguyen Q. Ha
(74) *Attorney, Agent, or Firm* — Tumey L.L.P.

(57) ABSTRACT

A method and apparatus for testing a blowout preventer which includes a plurality of safety devices and an assembly of fluid control valves that are remotely actuatable to an open and closed position for controlling flow of drilling fluids into a well includes a hydraulic power unit control station for remotely and selectively actuating one or more safety devices and fluid control valves to a test orientation. A hydrostatic test system supplies fluid under first and second test pressure and documents any pressure loss due to fluid leaks within a closed system.

12 Claims, 2 Drawing Sheets

(56) References Cited

U.S. PATENT DOCUMENTS

| | | | |
|---|---|---|---|
| 2012/0197527 A1* | 8/2012 | McKay | E21B 41/0007 |
| | | | 702/6 |
| 2013/0054034 A1 | 2/2013 | Ebenezer | |
| 2013/0167944 A1 | 4/2013 | Egeland | |
| 2013/0311093 A1 | 11/2013 | Warren Winters et al. | |
| 2014/0123746 A1* | 5/2014 | Jaffrey | E21B 47/0001 |
| | | | 73/152.18 |
| 2015/0198001 A1* | 7/2015 | McWhorter | E21B 33/064 |
| | | | 166/336 |

OTHER PUBLICATIONS

International Search Report and Written Opinion for International Application No. PCT/US2016/0026246 dated Sep. 23, 2016.

USPTO Non-Final Office Action for U.S. Appl. No. 15/086,419 dated Nov. 21, 2017.

USPTO Issue Notification for U.S. Appl. No. 15/086,419 dated Oct. 3, 2018.

USPTO Notice of Allowance for U.S. Appl. No. 15/086,419 dated Jun. 18, 2018.

* cited by examiner

AUTOMATED BOP CONTROL AND TEST SYSTEM

CROSS-REFERENCE TO RELATED APPLICATIONS

This application is a continuation of U.S. application Ser. No. 15/086,419 filed Mar. 31, 2016 which claims priority to provisional application Ser. No. 62/143,995, filed Apr. 7, 2015, the entire contents of which is incorporated herein by reference thereto.

BACKGROUND OF THE INVENTION

Field of the Invention

This invention relates to an automatic testing system for testing the functionality and integrity of various components of a blowout preventer (BOP). A blowout preventer typically includes a number of safety devices for preventing high pressure within a formation from creating a blowout situation. Also a plurality of control valves to direct the flow of pressurized drilling fluid in a safe and controlled manner are associated with the BOP. It is necessary to periodically pressure test these components.

Description of Related Art

Oil and Gas Exploration risk management includes the ability to control subsurface pressures which may be encountered during drilling operation. The primary mechanism utilized by operators to control downhole pressure is the hydrostatic pressure as a result of the drilling fluid contained within the wellbore. The drilling fluid is engineered and formulated to a density that provides a hydrostatic pressure inside of the wellbore that is greater than the formation pressure being drilled. In the majority of drilling operations, the hydrostatic control of wellbore pressure is adequate. However, from time-to-time the operator may encounter a higher than expected formation pressure where there is not adequate hydrostatic pressure to control the wellbore pressure. During these times the operator relies on a series of mechanical controls to stabilize the wellbore and prevent a "Blow Out". A blow out is the uncontrolled release of fluid or gas from the wellbore. This event is extremely dangerous and therefore must be avoided if at all possible. The primary mechanical control device utilized by operators to control wellbore pressure is the Blowout Preventer (BOP) assembly. The BOP assembly typically consists of multiple sealing and shearing devices that are hydraulically actuated to provide various means of sealing around the drill string or shearing it off entirely, thereby completely sealing the wellbore. Additionally there is a series of valves attached directly to or remotely located in close proximity to the BOP assembly that make up the pressure control manifold assembly and are inclusive to the BOP assembly. These valves are opened or closed as required to direct pressurized drilling fluid in a safe and controlled manner. Opening or closing these valves to direct the flow of pressurized drilling fluid is commonly referred to within the industry as "aligning the valves". Valve alignment is principally a manual operation. It is essential that the BOP assembly operates as designed during critical operations. Therefore it is a regulatory requirement to test the functionality and the integrity of the BOP assembly before starting drilling operations and at specific events during the drilling operations. Typically the interval between these tests is approximately 14 days. The BOP Assembly test is a series of pressure tests at a minimum of two pressure levels, low pressure and high pressure. Each test of the series of tests is carried out according to a "Test Plan". The test plan specifies, among other test requirements, the precise alignment of the valves applicable to the test. A typical test plan can include as many as 30 or more valves which may be required to be aligned differently for each pressure test. FIG. 1 depicts a typical BOP assembly with the internal multiple sealing and shearing devices such as Annular 34, Pipe Rams 35, and Blind Rams 36, as well as the external valves numbered 1 through 32. The alignment of the valves is a time consuming and problematic manual operation. Proper valve alignment is fully reliant on the diligence of the rig personnel and there is no visual indication that the valves are properly aligned. Conversely the multiple sealing and shearing devices within the BOP are fully automated and remotely operated via an automated hydraulic control system. During a typical BOP assembly pressure test, rig personnel would quickly and accurately align the multiple sealing and shearing devices within the BOP assembly, utilizing the automated controls, as specified by the test plan, but would be required to manually align the BOP Assembly valves outside of the BOP. The pressure test would commence once the multiple sealing and shearing devices and valves of the BOP assembly are deemed and confirmed to be aligned properly as specified by the test plan. During the pressure test, intensifying fluid from a high pressure intensifying pump unit is introduced into the BOP assembly in a volume sufficient to cause the internal pressure within the BOP assembly to rise to the specified level indicated on the test plan. The high pressure intensifying pump is normally a truck or trailer mounted unit which is transported to the rig location when pressure testing is required. These are referred to within the industry as "hydrostatic test units". The portable hydrostatic test units will remain on location until the test plan is completed, usually about 12 hours. Portable hydrostatic test units are typically a manually operated device where the technician engages or disengages the pump to achieve the test pressure specified by the test plan. Coordination between the drilling rig personnel who are controlling the BOP assembly test and the truck technician is typically handled via a two-way radio. When the rig personnel are reasonably sure the BOP assembly valves are align correctly and they deem it safe to conduct a test, they will radio the truck to commence the test. Subsequent to a successful pressure test the BOP assembly will be aligned for the next test. This procedure would be repeated multiple times until the entire test plan was completed. A schematic of a rig setup typical of current technology as described above is depicted in FIG. 2. BOP assembly internal sealing and shearing devices 34, 35, 36, of BOP 40 and hydraulic power unit 50 are in control fluid communication via control fluid conduit 45. Control fluid conduit 45 is made up of multiple discrete fluid control circuits. BOP assembly external valves 41 are in intensifying fluid communication with BOP assembly 40. Hydraulic power unit 50 includes a local control station 60. Hydraulic power unit 50 is in signal communication with remote control station 70 via signal cable 80. BOP assembly external valves 41 are manually operated as required. Additionally during the test period portable hydrostatic test system 90 is temporally placed in intensifying fluid communication with BOP assembly internal sealing and shearing devices 34-36 via intensifying fluid conduit 100. During a typical pressure test of the BOP assembly, BOP assembly internal sealing and shearing devices 34, 35, and 36 are aligned according to the test plan by providing the proper control signals from remote control station 70 via signal cable 80. BOP assembly external valves 1-32 are manually aligned as required by the test plan. The rig personnel confirm that the valves are properly aligned and that it is safe to proceed with the pressure test. The rig personal will signal the technician of portable hydrostatic test system 90 via a two-way radio to commence the pressure test. The technician of portable hydrostatic test system 90 will manually initiate the high pressure intensifying pump of portable hydrostatic test system 90. High pressure intensifying fluid from portable hydrostatic test system 90 will intensify the internal pressure of BOP assembly internal sealing and shearing devices 42 and BOP assembly external valves 41 according to the specific alignment schedule of the test plan via intensifying fluid conduit 100. Subsequent to a successful pressure test, intensifying fluid is relieved from BOP assembly internal sealing and shearing devices 35, 36 and BOP assembly external valves 41 via portable hydrostatic test system 90 and intensifying fluid conduit 100. At this point BOP assembly internal sealing and shearing devices 34, 35, 36 and BOP assembly external valves 1-32 will be aligned according to the test plan and the next subsequent test can be initiated. This process is repeated for each test of the test plan. At the completion of the test plan portable hydrostatic test system 90 and intensifying fluid conduit 100 will be disconnected from the BOP assembly in preparation for transportation to the rig sight. In approximately 14 days the entire process will be repeated.

The entire pressure cycle of these tests are performed without the use of automation. Automating this process would help to insure continuity and safety of the pressure procedure between the hydrostatic unit and the BOP assembly. The manual and separate nature of the test procedure is problematic and dangerous. Additionally the manual process of aligning the valves is very time consuming. It is not uncommon for this part of the test to consume more time than the actual pressure test. It would be much more desirable to have an improved system that fully automates the alignment of the valves. Hydraulically operated valves are commercially available, for example the Valves Works USA FC series valve, and are suitable for use as a component of a fully automated BOP Assembly operating and testing system. These valves respond to intensified hydraulic fluid to open or close as directed by control valves and a hydraulic power source. Alternatively other types of valves could be used which are electrically or air operated. Thus there remains a need for a fully automated system to provided BOP Assembly operating and testing capabilities integral to one system capable of being operated from a single remote control panel, a single local control panel, or as part of an automated drilling control system.

BRIEF SUMMARY OF THE INVENTION

The present invention is directed to a system and method for pressure testing a BOP assembly that includes a plurality of hydraulically actuated safety devices and a plurality of valves for regulating drilling fluid pressure within the well.

The invention includes the provision of remotely actuatable valves that can be positioned for testing purposes automatically and remotely by the same hydraulic power source used to actuate the safety devices in the event of an emergency. Alternately the valves may be remotely actuated by an electrical power source selectively connected to electrical actuators such as solenoids provided on the valves.

The following detailed description and drawings of the preferred embodiment of the Automated BOP Control and Test System is intended as an exemplification of the principals of the invention and not intended to limit the invention to any specific embodiment.

DETAILED DESCRIPTION OF THE PREFERRED EMBODIMENTS

Figure 1:
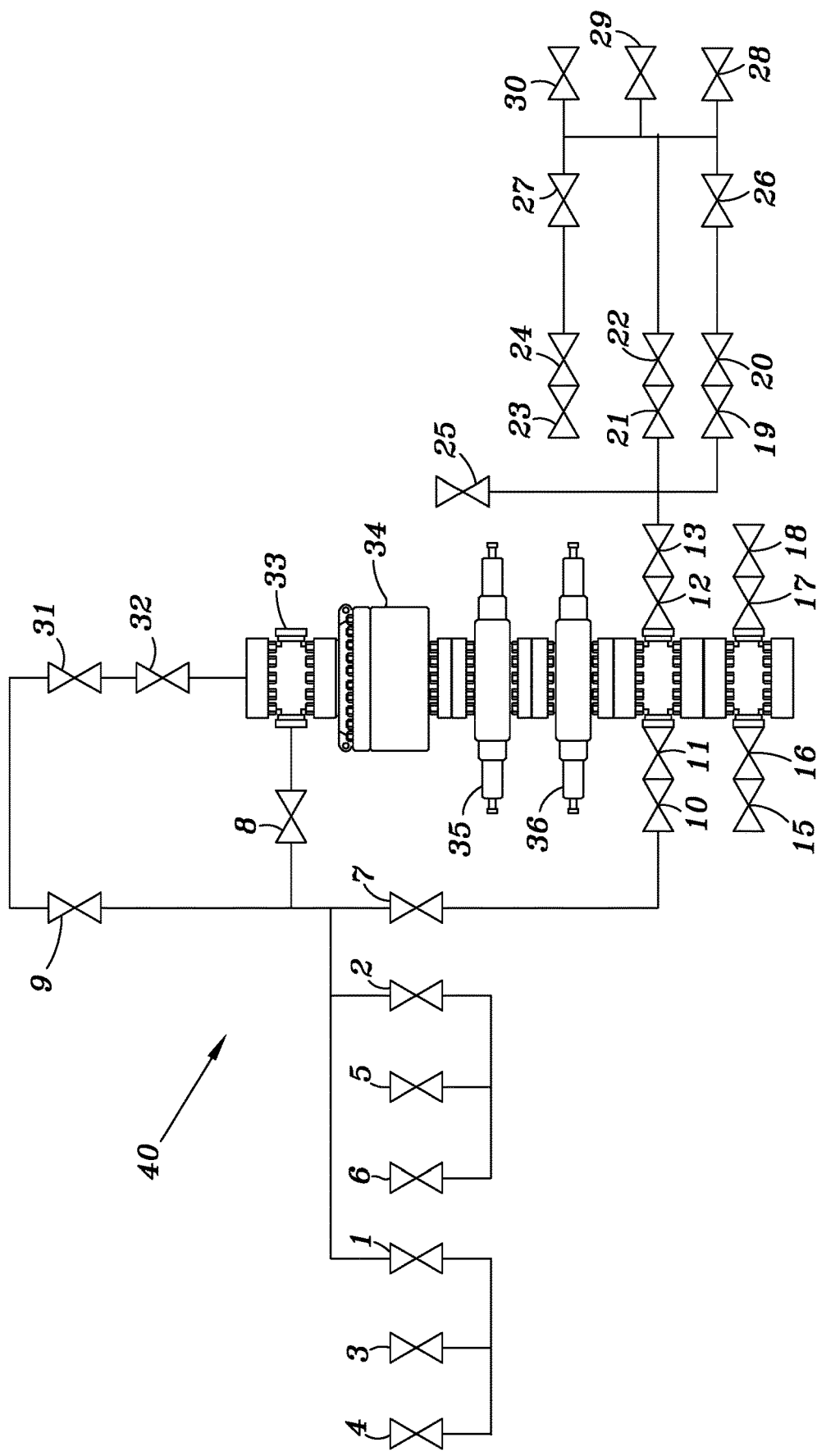
FIG. 1 is a schematic view of a conventional blowout preventer showing various safety control devices and pressure controlling valves.

As shown in FIG. 1, a typical blowout preventer assembly 40 includes a plurality of valves 1-32 for controlling the pressurized drilling fluid in a safe and controlled manner.

BOP assembly 40 also includes a number of sealing and shearing devices 34, 35 and 36 that are hydraulically actuated to provide various means of sealing around the drill string or shearing it off completely.

In this example, the BOP includes an annular sealing device 34, pipe rams 35 and blind rams 36.

Figure 2:
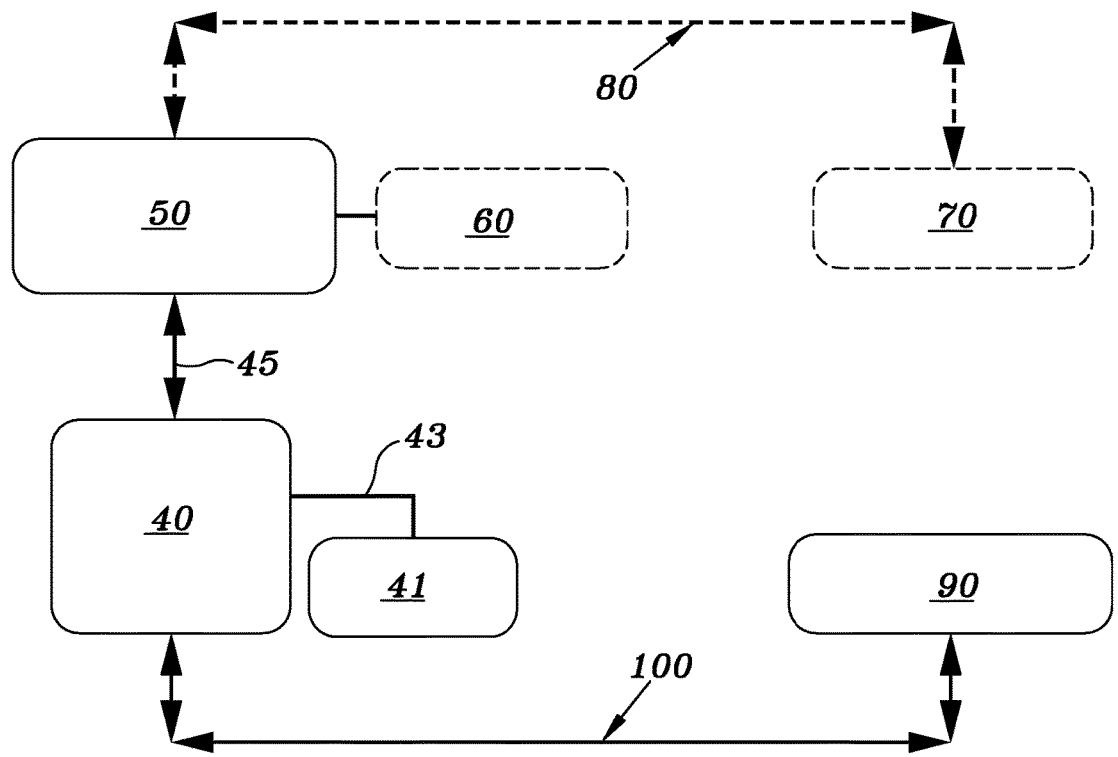
FIG. 2 is a schematic showing of a conventional testing arrangement for a blowout preventer.

A typically testing arrangement is shown in FIG. 2. The blowout preventer assembly 40 is connected to a hydraulic power unit 50 utilized to actuate the safety devices 34, 35, and 36 in the event of an emergency. Hydraulic power unit 50 may be controlled by a local control station 60 or a remote control station 70 via a control cable 80 or a wireless control.

The safety devices and external valves are connected to a portable hydraulic test system 90 which generates testing fluid under various pressures for testing the integrity of the various valves and safety devices as described above.

As an example, the chart below illustrates a typically sequence of tests involving the various valves and safety devices. The valves are aligned and set by hand.

| Test Number | Test Against | Low Test Pressure & Times | High Test Pressure & Times |
| --- | --- | --- | --- |
| Test 1 | V1, V2, V8 Pipe Rams, V20, V22, V24, V25 | Low: 250 psi, 5 minutes | High: 5000 psi, 10 minute |
| Test 2 | V7, V(, Pipe Rams, V19, V21, V23, V25 | Low: 250 psi, 5 minutes | High: 5000 psi, 10 minute |
| Test 3 | Topdrive Hydraulic Valve, Pipe Rams, V10, V13 | Low: 250 psi, 5 minutes | High: 5000 psi, 10 minute |
| Test 4 | Lower Topdrive Manual Valve, Pipe Rams, V11, V12 | Low: 250 psi, 5 minutes | High: 5000 psi, 10 minute |
| Test 5 | Lower Topdrive Manual Valve, ANNULAR PREVENTER, V11, V12 | Low: 250 psi, 5 minutes | High: 3500 psi, 10 minute |
| Test 6 | V14, Blind Rams, V19, V21, V23 | Low: 250 psi, 5 minutes | High: 5000 psi, 10 minute |
| Test 7 | Casing, V14 Blind Rams, V19, V21, V23, V15, V18 | Low: 250 psi, 5 minutes | High: 1500 psi, 30 minute |
| Test 8 | Cup Type Tester, V14, Pipe Rams, V19, V21, V23, V15, V18 | Low: 250 psi, 5 minutes | High: 5000 psi, 10 minute |
| Test 9 | Cup Type Tester, V14, Pipe Rams, V19, V21, V23, V16, V17 | Low: 250 psi, 5 minutes | High: 5000 psi, 10 minute |

Figure 3:
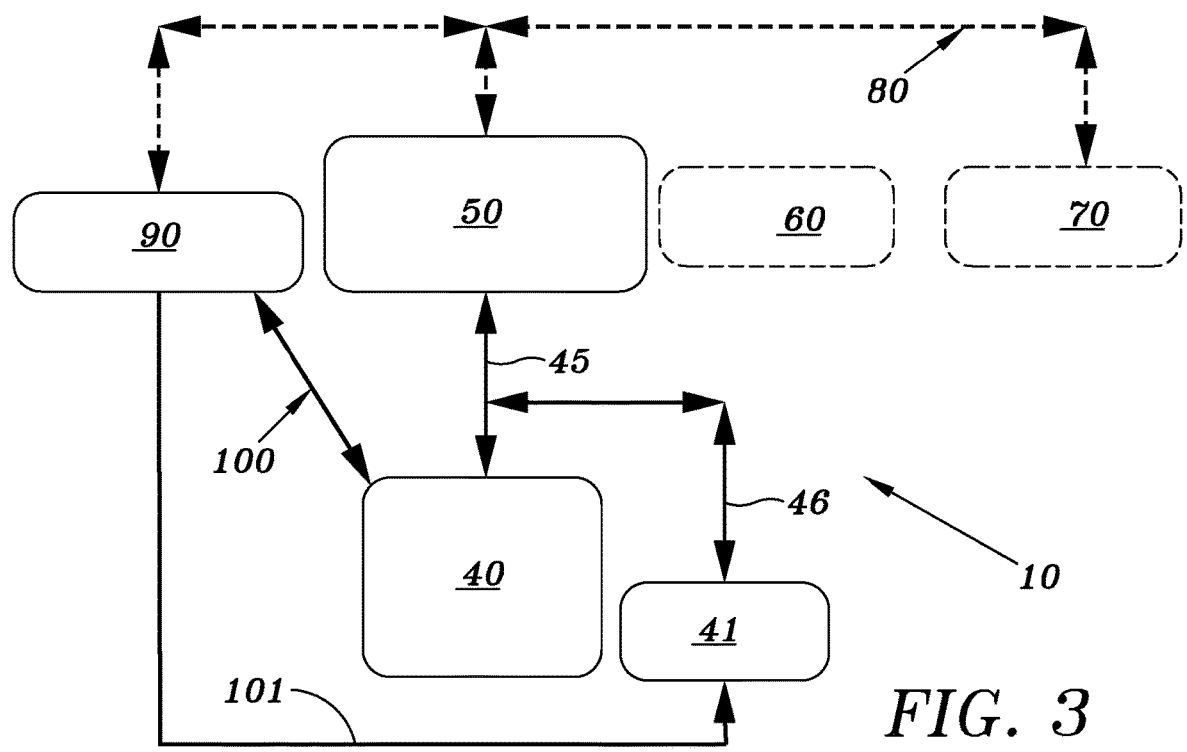
FIG. 3 is a schematic showing of an automated control and testing system for a blowout preventer according to an embodiment of the invention

Referring to FIG. 3 of an embodiment of the invention will be described.

A schematic of a rig setup utilizing the new and unique features of the current invention is depicted in FIG. 3. BOP assembly internal sealing and shearing devices 34-36, BOP 40 assembly external automated valves 1-32 shown schematically at 41, and hydraulic power unit 50 are in control fluid communication via control fluid conduit 45. Control fluid conduit 45 is made up of multiple discrete fluid control circuits. Hydraulic power unit 50 may include local control station 60. Hydraulic power unit 50 and hydrostatic test system 90 are also in signal communication with remote control station 70 via signal cable 80. Hydrostatic test system 90 is in intensifying fluid communication with BOP assembly internal sealing and shearing devices 34-36 via intensifying fluid conduit 100. A suitable hydrostatic test system is disclosed in U.S. patent application Ser. No. 14/932,727 filed Nov. 4, 2015, the entire contents of which is incorporated herein by reference thereto. BOP assembly external automated valves 1-32 are in intensifying fluid communication with hydrostatic test system 90 via conduit 101. During a test utilizing the new and unique features of the current invention, BOP assembly internal sealing and shearing devices 34-36 and BOP assembly external automated valves 1-32 are aligned according to the test plan by providing the proper control signals from remote control station 70 via signal cable 80. For Example: test 1 of the test plan depicted in the chart requires closing the pipe rams of BOP Assembly as well as BOP assembly external automated valves numbers 1, 2, 8, 20, 22, 24, and 25. A suitable computer program within remote control station 70 would enable the specific solenoid valve of hydraulic power unit 50, via signal cable 80, directing hydraulic control fluid, via control fluid conduit 45 to close the Pipe Rams of BOP assembly 40. Additionally the suitable computer program within remote control station 70 would enable the specific solenoid valves of hydraulic power unit 50, via signal cable 80, directing intensified hydraulic control fluid, via control fluid conduits 45 and 46 to close BOP assembly external automated valves numbers 1, 2, 8, 20, 22, 24, and 25. Subsequent to remote control station 70 confirming proper alignment of BOP assembly internal sealing and shearing devices 34-36 and BOP assembly external automated valves 1-32 via signal cable 80, remote control station 70 will initiate the hydrostatic pressure test of BOP assembly internal sealing and shearing devices 34-36, and selected BOP assembly external automated valves 1-32 via signal cable 80. High pressure intensifying fluid from hydrostatic test system 90 will intensify the internal pressure of BOP assembly internal sealing and shearing devices 34-36 and BOP assembly external valves 1-32 according to the specific alignment schedule of the test plan via intensifying conduits 100 and 101.

Subsequent to a successful pressure test, intensifying fluid is relieved from BOP assembly internal sealing and shearing devices 34-36 and BOP assembly external valves 1-32 via hydrostatic test system 90 and intensifying fluid conduits 100 and 101. BOP assembly internal sealing and shearing devices 34-36 and BOP assembly external valves 1-32 will be aligned for the next test according to the test plan by providing the proper control signals from remote control station 70 via signal cable 80 to hydraulic power unit 50 and hydrostatic test system 90 so the next subsequent test can be initiated. This process is repeated for each test of the test plan.

Utilizing the new and unique features of the current invention provides for fully automatic, integrated, BOP assembly operation and testing thereby significantly increasing safety, while dramatically reducing cost. The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention. For example an electrical control system could be used for electrically controlling valve 1-32 to an open or closed position with the use of solenoid controlled valves.

Although the present invention and its advantages have been described in detail, it should be understood that various changes, substitutions and alterations may be made herein without departing from the spirit and scope of the invention as defined by the appended claims.

What is claimed is:

1. A method of conducting a pressure test for a blowout preventer which includes a plurality of safety devices operated by hydraulic pressure and for an assembly of fluid control valves and conduits for directing pressurized drilling fluid into or out of a wellbore, the fluid control valves being remotely actuated to an open or closed position comprising;
   a) determining a test plan for testing isolated portions of the blowout preventer and fluid control valves and conduits,
   b) causing pressurized fluid from a hydraulic power unit to align one or more of the safety devices within the blowout preventer and the fluid control valves according to the test plan, and
   c) applying a first fluid test pressure to the blowout preventer and to the assembly of fluid control valves and conduits via a hydraulic test system.

2. The method of claim 1 including the step of applying a second fluid test pressure to the blowout preventer and assembly of fluid control valve and conduits.

3. The method of claim 2 including the step of selecting one or more different safety devices according to the test plan and selecting one or more different fluid control valves to close and causing pressurized fluid to operate the one or more safety devices and to close the one or more different fluid control valves according to the test plan.

4. The method of claim 1 wherein the hydraulic power unit supplies pressurized fluid to the blowout preventer for operating the safety devices in the event of an emergency and also provides pressurized fluid for remotely controlling the fluid control valves to an open or closed position, during a test procedure.

5. The method of claim 4 further compressing the step of providing a hydraulic power unit remote control station for controlling the hydraulic power unit.

6. The method of claim 5 further comprising sensing the condition of the fluid control valves and sending information about the condition to the hydraulic unit remote control station.

7. The method of claim 1 further comprising the step of providing a hydraulic power unit local control station.

8. Apparatus for testing a blowout preventer having a plurality of safety devices and an assembly of fluid control valves and conduits for directing drilling fluid into a well comprising;
   a) a hydraulic power unit for operating one or more of the safety devices in the blowout preventer in the event of an emergency, b) a hydrostatic test system for pressurizing one or more safety devices and the assembly of fluid control valves to a first test pressure, c) the fluid control valves adapted to be remotely controlled to an on and off state, and a hydraulic power unit control station coupled to the hydraulic power control unit to remotely and to selectively control the safety devices in the blowout preventer and the state of the fluid control valves during a test cycle.

9. Apparatus for testing a blowout preventer as claimed in claim 8 further including a communications link between the hydraulic power unit and the hydraulic power unit control station for selectively actuating the safety devices and closing the valves to an off condition in accordance with a test plan.

10. Apparatus as claimed in claim 8 wherein the hydrostatic test system is also controlled by the hydraulic power unit control station.

11. Apparatus as claimed in claim 8 wherein the hydrostatic test system is adapted to supply fluid under a first test pressure and a second test pressure to the blowout preventer.

12. The apparatus of claim 8 wherein the blowout preventer is in fluid communication with the assembly of fluid valves and conduits.

* * * * *